(12) United States Patent
Hama

(10) Patent No.: US 7,432,954 B2
(45) Date of Patent: Oct. 7, 2008

(54) COMMUNICATIONS TERMINAL HAVING IMAGE SHOOTING FUNCTION AND PROGRAM FOR THE COMMUNICATIONS TERMINAL

(75) Inventor: Mitsuji Hama, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 417 days.

(21) Appl. No.: 10/523,341

(22) PCT Filed: Aug. 6, 2003

(86) PCT No.: PCT/JP03/09977

§ 371 (c)(1), (2), (4) Date: Jan. 27, 2005

(87) PCT Pub. No.: WO2004/017632

PCT Pub. Date: Feb. 26, 2004

(65) Prior Publication Data

US 2006/0121850 A1    Jun. 8, 2006

(30) Foreign Application Priority Data

Aug. 12, 2002  (JP) ............................ 2002-235186

(51) Int. Cl.
*H04N 5/232* (2006.01)

(52) U.S. Cl. .................... 348/211.2; 455/41.2
(58) Field of Classification Search .............. 348/211.2; 382/236, 232; 455/41.2, 556.1, 556.2; 375/240.1
See application file for complete search history.

(56) References Cited

U.S. PATENT DOCUMENTS

| | | | | |
|---|---|---|---|---|
| 6,369,908 | B1 * | 4/2002 | Frey et al. | 358/1.15 |
| 6,427,005 | B2 * | 7/2002 | Toyoda et al. | 379/100.08 |
| 6,525,768 | B2 * | 2/2003 | Obradovich | 348/231.99 |
| 6,642,959 | B1 * | 11/2003 | Arai | 348/231.3 |
| 7,013,288 | B1 * | 3/2006 | Reifel et al. | 705/26 |
| 7,106,906 | B2 * | 9/2006 | Iwamura | 382/236 |
| 7,173,651 | B1 * | 2/2007 | Knowles | 348/207.1 |
| 2003/0137422 | A1 | 7/2003 | Nishibori | |

FOREIGN PATENT DOCUMENTS

| | | |
|---|---|---|
| JP | 2001-273207 | 10/2001 |
| JP | 2002-101369 | 4/2002 |
| JP | 2002-152453 | 5/2002 |

* cited by examiner

*Primary Examiner*—Tuan Ho
*Assistant Examiner*—Amy Hsu

(57) ABSTRACT

A communications terminal having an image shooting function allows a user to transmit a shot image as an e-mail attachment more easily and conveniently than in a conventional manner. Before being placed into an image shooting mode, the communications terminal first receives an e-mail address specified by the user as a destination of an image to be shot. Then, at a push of a shutter button in the image shooting mode, the communications terminal shoots an image to generate image data, automatically attaches the image data to an e-mail message, and transmits the e-mail message to the e-mail address specified by the user before the image shooting.

17 Claims, 10 Drawing Sheets

FIG.4

| NAME | TELEPHONE NUMBER | E-MAIL ADDRESS | AUTO-ATTACHMENT FLAG |
|---|---|---|---|
| TARO YAMADA | 090-△×○×-○××○ | ○○○@×××.com | |
| JIRO SUZUKI | 070-×△×○-○△△○ | ○×○@△×○.or.jp | |
| SABURO SATO | 090-□×△△-△△×× | ○×△@○○○.co.jp | ○ |
| HANAKO ITO | 06-○×△△-△○×× | ○△△@○○×.ac.jp | |

| NAME | TELEPHONE NUMBER | E-MAIL ADDRESS | ASSIGNED SHUTTER BUTTON |
|---|---|---|---|
| TARO YAMADA | 090-△×○×-○×× ○ | ○○○@×××.com | 1 |
| JIRO SUZUKI | 070-×△×○-○△△○ | ○×○@△×○.or.jp | 2 |
| SABURO SATO | 090-□×△△-△△×× | ○×△@○○○.co.jp | 3 |
| HANAKO ITO | 06-○×△△-△○×× | ○△△@○○×.ac.jp | SIDE BUTTON |

30

COMMUNICATIONS TERMINAL HAVING IMAGE SHOOTING FUNCTION AND PROGRAM FOR THE COMMUNICATIONS TERMINAL

TECHNICAL FIELD

The present invention relates to a communications terminal having an image shooting function. More particularly, the present invention relates to a technique for transmitting image data generated by image shooting as an e-mail attachment.

BACKGROUND ART

In recent years, there has been a rapidly growing trend toward more and more functions incorporated into a communications terminal, such as a mobile phone and a PDA (Personal Digital Assistance). Especially, communications terminal having an image shooting function is at the center of users' attention. A communications terminal having an image shooting function is provided with a camera unit composed of a shooting lens and either a CCD (Charge Coupled Device) or a CMOS (Complementary Metal Oxide Semiconductor) image sensor. Alternatively, the camera unit may be provided as an external unit that is optionally connectable to such a communications terminal. With the above construction, a communications terminal having an image shooting function doubles as a digital cameras.

When shooting a still image using a communications terminal having an image shooting function, a user first needs to put the communications terminal into an image shooting mode. In the image shooting mode, the communications terminal reproduces on its display unit, image data that is sequentially transmitted from the camera unit. While viewing the image on the display unit, the user pushes a button functioning as a shutter (hereinafter, referred to simply as a shutter button). The communications terminal generates image data representing a still image that is taken with the camera unit at the moment when the shutter button is pushed, and stores the generated image data into a built-in memory using a predetermined data compression codec. Further, some models of communications terminals are capable of shooting moving images.

The compressed image data stored in a communications terminal may be reproduced on the display unit. In addition, using a mail function of the communications terminal, the image data may be transmitted as an e-mail attachment to a personal computer owned by the user of the communications terminal or another communications terminal owned by another user. Note that the term "e-mail" used herein refers to electronic messages that can be sent over a communications network. An e-mail message may be text-based. In addition, binary files representing, for example, audio and video data may be optionally attached to an e-mail message.

To compose an e-mail message on a communications terminal having an image shooting function, a user first puts the communications terminal into an e-mail composition mode, so that a GUI (Graphical User Interface) screen for e-mail composition is displayed on the display unit. The user then inputs various data, such as an e-mail address being a destination of the e-mail message, a subject, and a text-based message. Here, the user may optionally attach image data to the e-mail message.

One reason that attributes the popularity of communications terminals having an image shooting function is found in its mail function. The mail function allows the transmission of shot images to another communications terminal without requiring any connection to another communications device.

Unfortunately, however, users are required to go through a series of operations in order to transmit a shot image to another communications terminal. For example, after shooting a sill image, the user needs to put the communications terminal into the e-mail composition mode, inputs a destination e-mail address, and selects image data to be attached. The series of operations is complicated especially when the user intends to transmit the image data immediately after shooting.

DISCLOSURE OF THE INVENTION

In order to reduce users' trouble involved in transmitting image data representing a shot still image, for example, the present invention aims to provide a communications terminal having an image shooting function that allows users to transmit the image data as an e-mail attachment more easily and conveniently than in a conventional manner. The present invention also aims to provide a control program for the communications terminal.

To achieve the above aims, one aspect of the present invention provides a communications terminal having an image shooting function. The communication terminal shoots an image to generate image data in response to an image shooting instruction from a user, and automatically attaches the image data to an e-mail message directed to an e-mail address designated by the user prior to receiving the image shooting instruction.

Here, the communications terminal may include: an address designation receiving unit operable to receive designation of the e-mail address from the user prior to the image shooting; a shooting instruction receiving unit operable to receive the image shooting instruction from the user; a generating unit operable to generate the image data by shooting the image based on the received image shooting instruction; and an attaching unit operable to, on generation of the image data by the generating unit, automatically attach the image data to the e-mail message directed to the e-mail address designated according to the address designation received by the address designation receiving unit.

With the constructions stated above, in response to a single image shooting instruction, the communications terminal automatically attaches the image data generated by image shooting to an e-mail message and transmits the e-mail message to a preliminarily designated e-mail address. Thus, the image data is transmitted as an e-mail attachment more easily and conveniently than in a conventional manner.

Here, the image data may be moving image data. The generating unit may generate the moving image data by shooting a moving image for a predetermined duration based on the image shooting instruction received by the shooting instruction receiving unit. On generation of the moving image data, the attaching unit may automatically attach the moving image data to the e-mail message directed to the e-mail address designated according to the address designation received by the address designation receiving unit.

Here, the image data may be moving image data. The communications terminal may include: an address designation receiving unit operable to receive designation of the e-mail address from the user prior to the image shooting; a start instruction receiving unit operable to receive from the user a start instruction requesting to start the image shooting; an end instruction receiving unit operable to receive from the user an end instruction requesting to end the image shooting; a generating unit operable to generate the moving image data by shooting a moving image for a duration starting upon receipt of the start instruction and ending upon receipt of the end instruction; and an attaching unit operable to, on generation of the moving image data by the generating unit, automatically attach the moving image data to the e-mail message directed to the e-mail address designated according to the address designation received by the address designation receiving unit.

Here, the communications terminal may further include: a display unit operable to visually present the image data on generation of the image data by the generating unit; and a save instruction receiving unit operable to receive from the user an instruction as to whether to save the presented image data. Only when the save instruction receiving unit receives an affirmative instruction, the image data may be saved and the attaching unit may automatically attach the image data to the e-mail message directed to the e-mail address designated according to the address designation received by the address designation receiving unit.

With the constructions stated above, the user is allowed to view the image data generated by image shooting, before deciding whether to instruct the communications terminal to save the image data and transmit the image data as an e-mail attachment.

Here, the communications terminal may further include: a display unit operable to, on generation of the image data by the generating unit, visually present the image data along with the e-mail address designated according to the address designation received from the user by the address designation receiving unit; and a transmission instruction receiving unit operable to receive from the user an instruction as to whether to transmit the presented image data as an attachment to the e-mail message directed to the presented e-mail address. Only when the transmission instruction receiving unit receives an affirmative instruction, the attaching unit may automatically attach the presented image data to the e-mail message directed to the presented e-mail address.

With the construction stated above, the user is allowed to view on the display unit the image data generated by image shooting and also the destination e-mail address. The user can then decide whether to instruct the communications terminal to transmit the image data to the destination e-mail address.

Here, the communications terminal may further include a transmitting unit operable to transmit the e-mail message on automatic attachment of the image data to the e-mail message by the attaching unit.

With the construction stated above, in response to a single image shooting instruction, the communications terminal serially performs the image shooting, the attachment of image data to an e-mail message, and the transmission of the e-mail message. Thus, the image data is transmitted as an e-mail attachment more easily and conveniently than in a conventional manner.

Here, the communications terminal may include first and second operating buttons each for receiving the image shooting instruction from the use. At a push of the first operating button, the image shooing may be performed to generate the image data. At a push of the second operating button, the image shooting may be performed to generate the image data, and the image data may be automatically attached to the e-mail message directed to the e-mail address designated by the user prior to the image shooting.

With the construction stated above, the user is allowed to selectively use the first and second operating buttons as desired. The first operating button corresponds to a conventional shutter button, whereas the second operating button triggers the series of operations for shooting an image to generate image data and subsequently attaching the image data to an e-mail message directed to the destination e-mail address designated in advance.

Specifically, when the user desires to shoot an image with no intention of transmitting the shot image, the first operating button is to be pushed. On the other hand, when the user desires to shoot an image and immediately transmit the shot image as an e-mail attachment, the second operating button is to be pushed.

Here, the communications terminal may include an operating button for receiving the image shooting instruction from the user. At a push of the operating button for less than a predetermined time period, the image shooing may be performed to generate the image data. At a push of the operating button for the predetermined time period or longer, the image shooing may be performed to generate the image data, and the image data may be automatically attached to the e-mail message directed to the e-mail address designated by the user prior to receiving the image shooting instruction.

With the construction stated above, the user is allowed to selectively perform the image shooting alone or the image shooting and the subsequent image data transmission, depending on whether to keep the operating button down longer than the predetermined time period.

Here, the communications terminal may include: a plurality of operating buttons each for receiving the image shooting instruction from the user; and a storing unit operable to store e-mail addresses each in association with one of the operating buttons. At a push of one of the operating buttons, the image shooting may be performed to generate the image data, and the image data may be automatically attached to an e-mail message directed to an e-mail address associated with the pushed operating button.

With the construction stated above, in response to a push of any of the operating buttons by the user, the communications terminal serially performs the image shooting, the selection of a destination e-mail address, and the attachment of image data to an e-mail message. Thus, the image data is transmitted as an e-mail attachment more easily and conveniently than in a conventional manner.

Here, the communications terminal may include: a clock unit operable to acquire a current date and time; and a date and time inserting unit operable to insert the date and time acquired at a time of the image shooting into text of the e-mail message to which the image data is automatically attached.

Here, the communications terminal may include: a current location acquiring unit operable to acquire a current location of the communications terminal; and a location inserting unit operable to insert the location of the communications terminal acquired at a time of the image shooting into text of the e-mail message to which the image data is automatically attached.

In another aspect, the present invention provides a program executable by a communications terminal having an image shooting function. The program includes: an address designation receiving step of receiving designation of an e-mail address from a user prior to image shooting; a shooting instruction receiving step of receiving an image shooting instruction from the user; a generating step of generating image data by shooting an image based on the received image shooting instruction; and an attaching step of, on generation of the image data in the generating step, automatically attaching the image data to an e-mail message directed to the e-mail address designated according to the address designation received in the address designation receiving step.

BRIEF DESCRIPTION OF THE DRAWINGS

FIG. 4 is a view showing a specific example of an e-mail address table stored in a RAM of the communications terminal;

FIG. 7 is a view showing a specific example of another e-mail address table stored in the RAM of the communications terminal;

BEST MODE FOR CARRYING OUT THE INVENTION

With reference to the accompanying drawings, the following describes embodiments 1 and 2 of a communications terminal having an image shooting function according to the present invention.

EMBODIMENT 1

Construction

Figure 1:
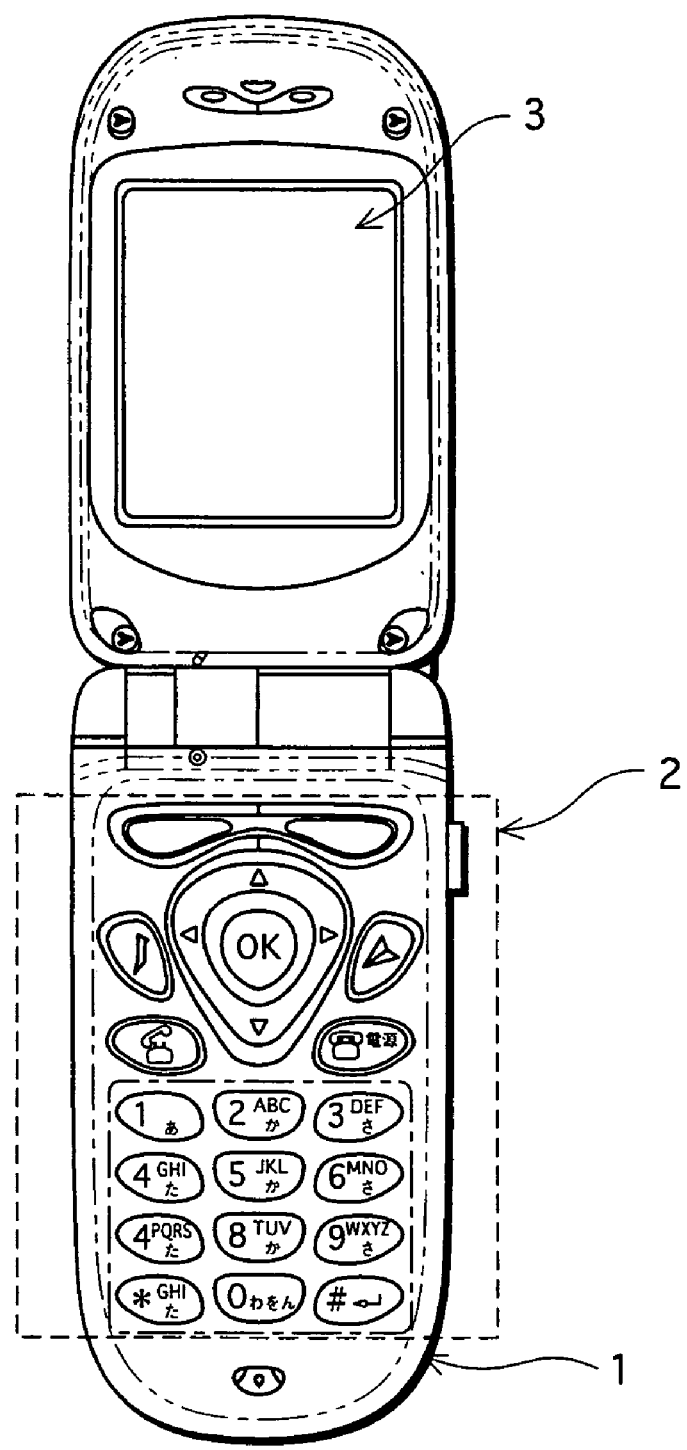
FIG. 1 is a view showing an exemplary external representation of a communications terminal having an image shooting function.
Figure 2:
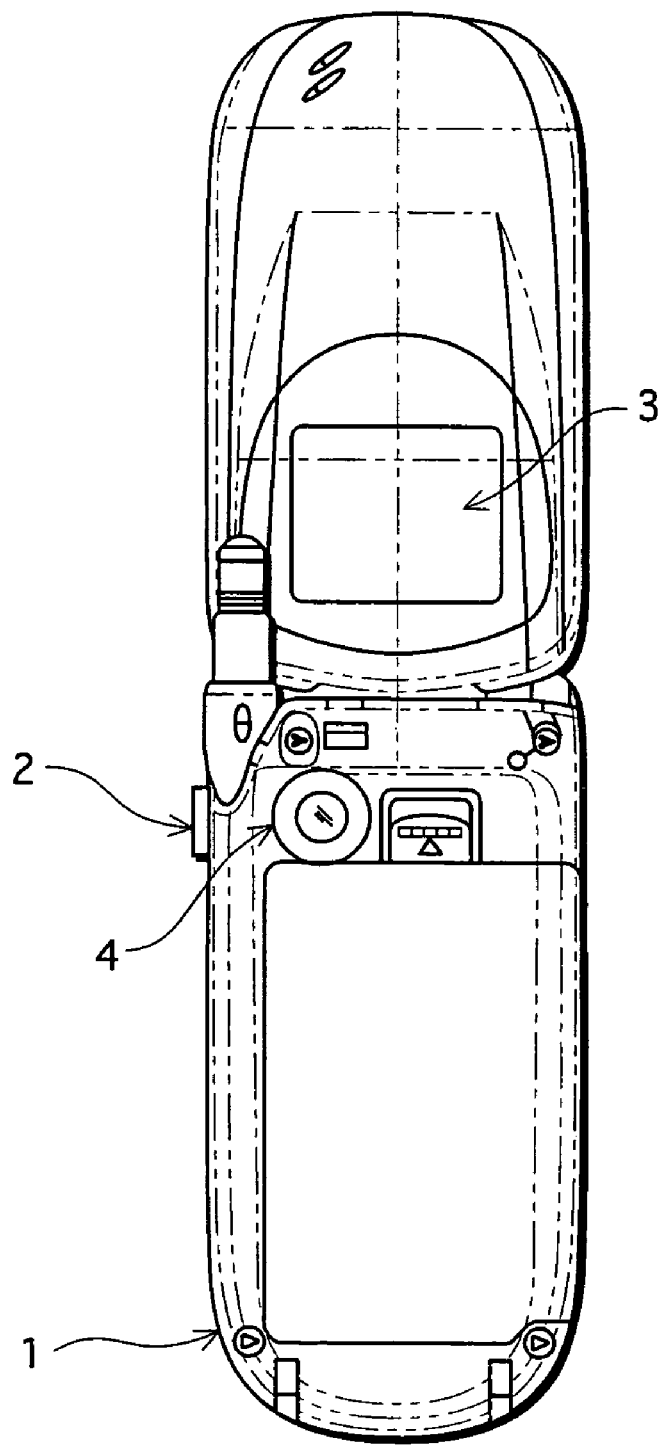
FIG. 2 is a view showing an exemplary external representation of the communications terminal.

FIGS. 1 and 2 are exemplary external representations of a communications terminal 1 having an image shooting function, according to the present invention. FIG. 1 is a front view of the communications terminal 1, and FIG. 2 is a back view.

Figure 3:
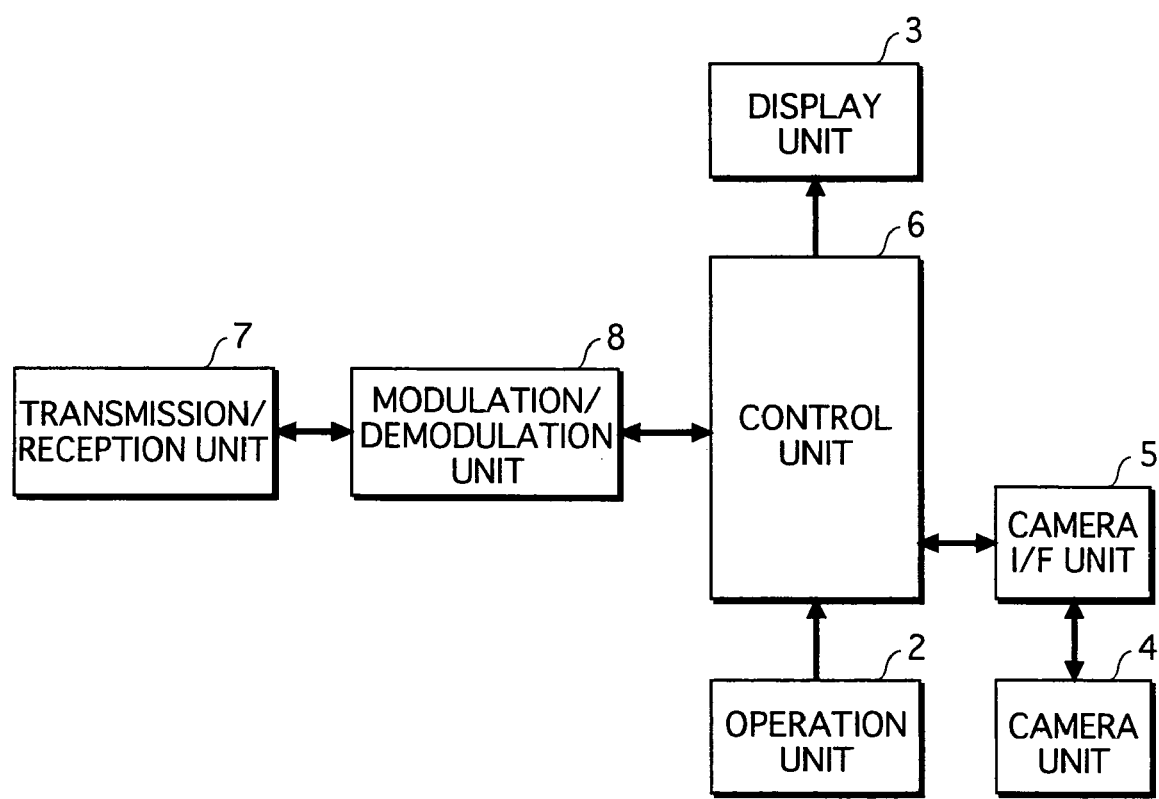
FIG. 3 is a functional block diagram of the communications terminal.

FIG. 3 is a functional block diagram of the communications terminal 1.

The communications terminal 1 is composed of an operation unit 2, a display unit 3, and a camera unit 4, a camera I/F unit 5, a control unit 6, a transmission/reception unit 7, and a modulation/demodulation unit 8. The operation unit 2, the display unit 3, and the camera unit 4 are externally visible, whereas the camera I/F unit 5, the control unit 6, the transmission/reception unit 7, and the modulation/demodulation unit 8 are provided inside the communications terminal 1. Note that description is omitted regarding functions that are not directly relevant to the present invention.

The operation unit 2 is connected to the control unit 6, and provided with various operating buttons such as ten-key numeric buttons corresponding to 0-9, a menu button, an OK button, an address button, a function button, an e-mail button, and a side button. The operation unit 2 receives user instructions inputted by operating theses buttons.

Examples of the user instructions include instructions requesting input of numbers or characters, as well as instructions requesting to display an e-mail address table, a mail composition screen, and a menu screen. The operation unit 2 passes received instructions to the control unit 6.

Each operating button is assigned to a specific instruction that is to be received at a push of the button by the user. Yet, the instruction assigned to the same button alters depending on the state (mode) of the communications terminal 1. For example, the ten-key numeric buttons function as buttons for inputting corresponding numbers in the normal stand-by mode. Yet, in the mail composition mode, the ten-key numeric buttons function as buttons for inputting letters of English alphabet or Japanese alphabet. In another example, the OK button or the side button shown in FIG. 1 functions as a shutter button in the image shooting mode.

The display unit 3 is connected to the control unit 6, and is composed generally of a color liquid crystal display device, a DMD (Digital Mirror Device), or an organic EL (Electro Luminescence) display device. The display unit 3 is capable of playing moving images as a stand-by screen in the stand-by mode. The display unit 3 is also capable of displaying image data shot with the camera unit 4 in the image shooting mode.

The control unit 6 is composed generally of a microprocessor, a DSP (Digital Signal Processor), a ROM (Read Only Memory), and a RAM (Random Access Memory). The control unit 6 performs various controls according to a control program stored in the ROM. When, for example, receiving via the operation unit 2 a user instruction requesting to go into the image shooting mode, the control unit 6 starts to receive image data from the camera I/F unit 5 and control the display unit 3 to display the received image data.

The RAM stores a table showing names of people, along with their telephone numbers and e-mail addresses, having been registered by the user. In addition, the RAM stores compressed image data representing shot images.

The image data stored in the RAM may include still images and moving images. The still images may be compressed by the JPEG (Joint Photographic Expert Group) format or the PNG (Portable Network Graphics) format. The moving images may be compressed by the MPEG (Moving Picture Experts Group) format or the Nancy file format.

The camera unit 4 is connected to the camera I/F unit 5, and is composed generally of a shooting lens and a CCD (or a CMOS image sensor). When the communications terminal 1 is put into the image shooting mode, the camera unit 4 converts an image formed, via the shooting lens, on a sensor surface of semiconductor photodetectors into electrical signals representing an amount of light incident to each photodetector. The camera unit 4 then A/D converts the electrical signals into digital signals, and transmits the digital signals to the camera I/F unit 5.

The camera I/F unit 5 is composed generally of a video output circuit and a work memory. When the communications terminal 1 is put into the image shooting mode, the camera I/F unit 5 performs image processing such as hue correction and resolution conversion on the digital signals received from the camera unit 4 so as to obtain signals ready for video output. The camera I/F unit 5 then transmits the resulting signals to the control unit 6. When receiving an image shooting instruction passed from the control unit 6, the camera I/F unit 5 temporality stores image data taken at the time of receiving the instruction into the work memory, and compresses the image data using a predetermined codec such as the JPEG format in the case of a still image. The compressed image data is passed to the control unit 6.

The transmission/reception unit 7 transmits/receives communications data. The communications data referred herein includes voice data for the users to perform voice conversation, mail-packet data, and control data used for transmission control.

The modulation/demodulation unit 8 modulates data to be transmitted and demodulates received data.

Data 1

FIG. 4 is a view showing a specific example of an e-mail address table 200 stored in the RAM of the control unit 6. The e-mail address table 20 is composed of columns corresponding to data items such as a name, telephone number, and e-mail address. In addition, the e-mail address table 20 includes a column showing, for each e-mail address, whether an auto-attachment flag is set. The auto-attachment flag indicates that image data is to be automatically transmitted as an e-mail attachment to the e-mail address. To set an auto-attachment flag, the user specifies an e-mail address on a GUI screen for image shooting setting, before putting the communications terminal 1 into the image shooting mode. The GUI screen for image shooting is displayed in response to a user selection made on a menu screen.

In the example of the e-mail address table 20, an auto-attachment flag is set for the e-mail address "ox△@ooo.co.jp" of "SABUROSATO". It should be appreciated that an auto-attachment flags may be set for as many e-mail addresses as desired.

Operation 1

Figure 5:
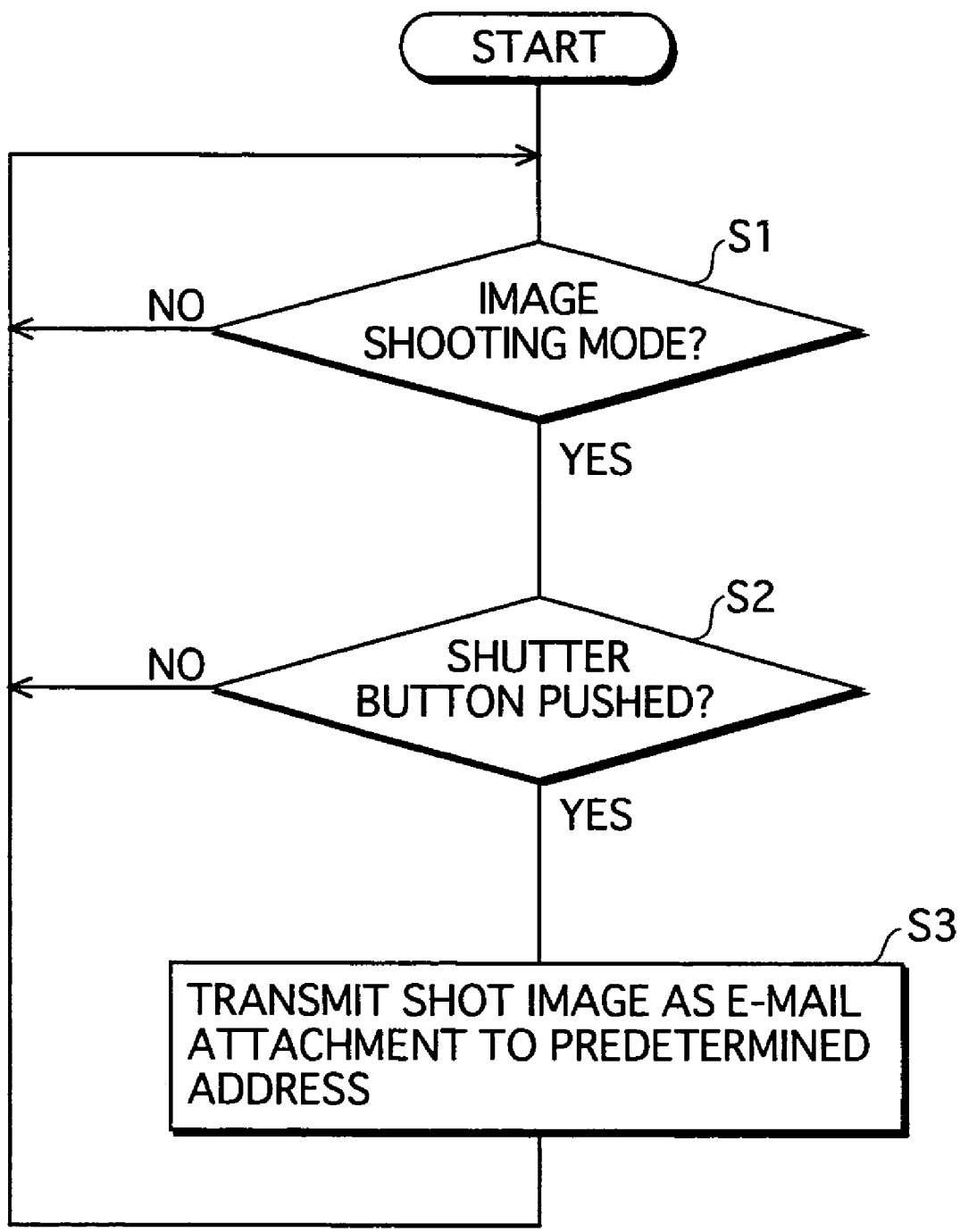
FIG. 5 is a flowchart of procedural steps performed by the communications terminal to shoot an image.

FIG. 5 is a flowchart of procedural steps performed by the communications terminal 1 to shoot an image and transmit the shot image as an e-mail attachment.

When the communications terminal 1 is put to the image shooting mode (step S1: YES), the control unit 6 generates, with reference to the e-mail address table stored in the RAM, an e-mail message directed to each e-mail address corresponding to a set auto-attachment flag.

Next, at a push of the shutter button by the user (step S2: YES), the control unit 6 issues a signal indicative of the image shooting instruction to the camera I/F unit 5. In response, the camera I/F unit 5 compresses image data that is temporarily stored in the work memory, and passes the compressed image data to the control unit 6. The control unit 6 then attaches the received image data to the e-mail message, and then transmits the e-mail message to its destination e-mail address (step S3). Then, the processing goes back to the step 1.

Figure 6:
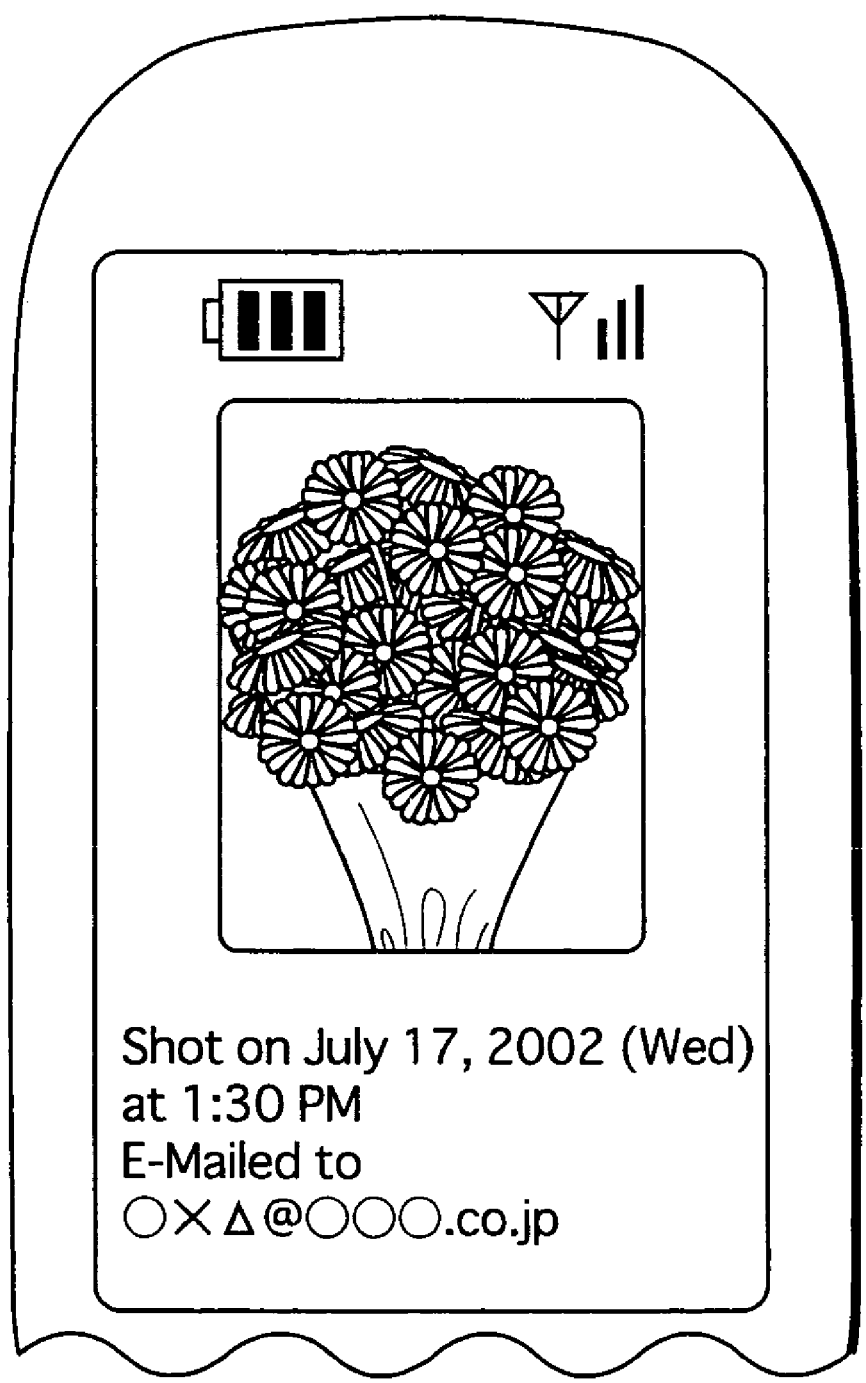
FIG. 6 is a view showing one example of a screen displayed on a display unit after transmission of image data as an e-mail attachment.

After transmitting the e-mail message, the control unit 6 may instruct the display unit 3 to display the attached image data, along with the destination e-mail address. FIG. 6 is a view showing one example of such a screen displayed on the display unit 3. As shown in the figure, the user is allowed to visually confirm the image data attached to the e-mail message as well as its destination e-mail address.

EMBODIMENT 2

Next, description is given to the embodiment 2 of a communications terminal having an image shooting function according to the present invention, with reference to the accompanying drawings. Note that the communications terminal of the embodiment 2 is similar in construction to the communications terminal 1 of the embodiment 1. Thus, description of the construction is omitted. Hereinafter, description is given to an e-mail address table and image shooting operations where the differences reside.

Data 2

FIG. 7 is a view showing a specific example of an e-mail address table 30 stored in the RAM of the control unit 6 according to the embodiment 2. The e-mail address table 30 is composed of columns corresponding to data items, such as a name, telephone number, and e-mail address. In addition, the e-mail address table 30 includes a column showing, for each e-mail address, a button assigned to carry out a shutter function. The assignment of shutter buttons are carried out on a GUI screen for image shooting setting by the user assigning a different one of the operating buttons of the operation unit 2 to each e-mail address stored on the address table.

In the example shown in FIG. 7, the operating buttons corresponding to the numerals "1", "2", and "3" and a side-button are assigned as shutter buttons. To be more specific, the numeral "1" button is assigned as a shutter button that is associated with the e-mail address "ooo @xxx.com"

Operation 2

Figure 8:
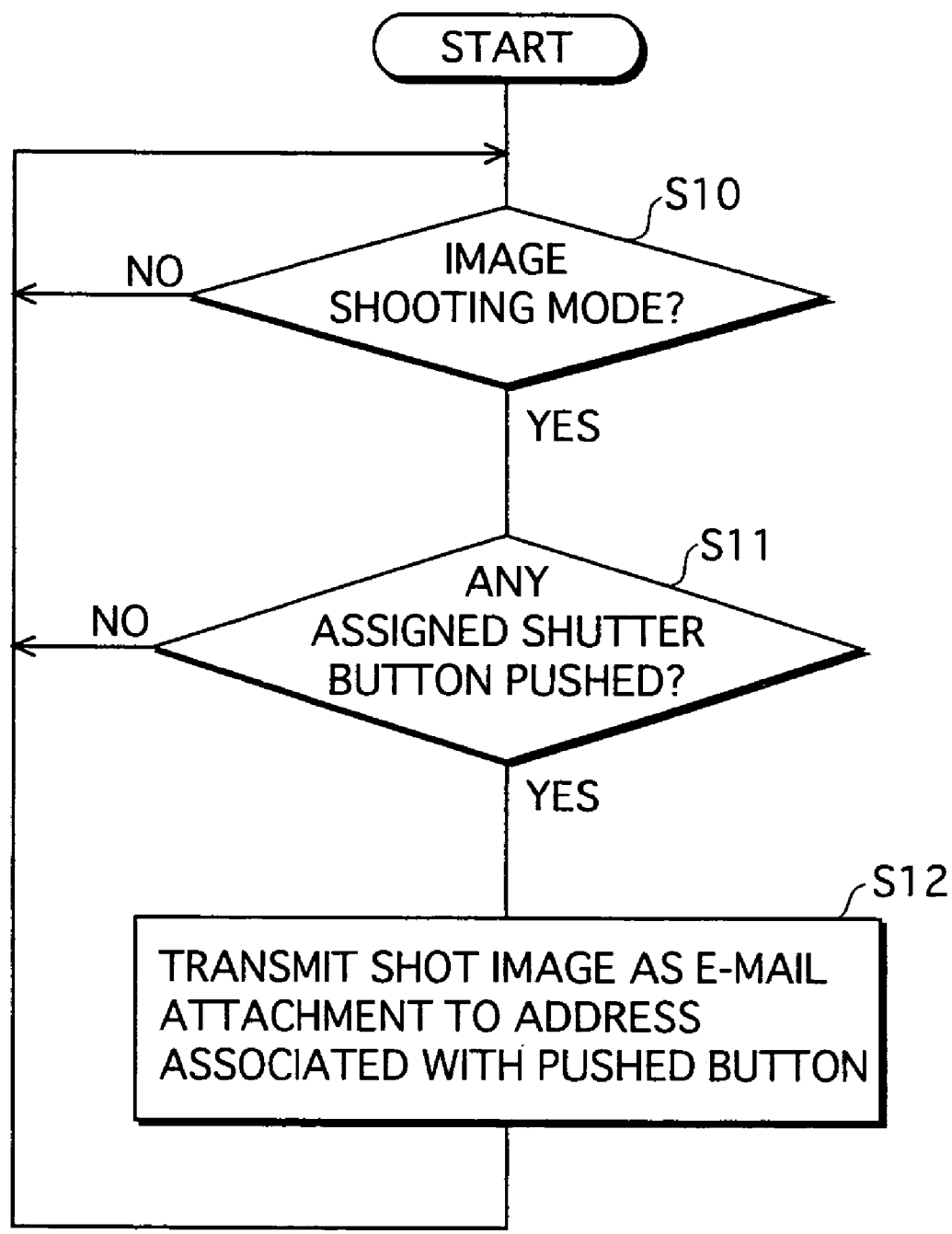
FIG. 8 is a flowchart of procedural steps performed by the communications terminal to shoot an image.

FIG. 8 is a flowchart of procedural steps performed by the communications terminal 1 of the embodiment 2 to shoot an image and transmit the shot image as an e-mail attachment.

When the communications terminal 1 is put to the image shooting mode (step S10: YES), the control unit 6 generates an e-mail message with a destination e-mail address being blank at this stage.

Next, at a push of one of the assigned shutter buttons (step S11, YES), the control unit 6 issues a signal indicative of the image shooting instruction to the camera I/F unit 5. In response, the camera I/F unit 5 compresses image data that is temporarily stored in the work memory, and passes the compressed image data to the control unit 6. With reference to the e-mail address table 30, the control unit 6 designates, as the destination e-mail address, the e-mail address that is associated with the pushed shutter button, and transmits the e-mail message to the destination e-mail address after attaching the compressed image data that is received from the camera I/F unit 5 (step S12).

Supplemental Note

Up to this point, the communications terminal having an image shooting function according to the present invention has been described by way of the above embodiments 1 and 2. Yet, it is naturally appreciated that the present invention is in no way limited to those specific embodiments, and modifications including the following may be made.

(1) In the embodiment 1, the OK button or the side-button of the communications terminal functions as a shutter button. Alternatively, however, any other operating button may function as a shutter button.

(2) The communications terminal having an image shooting function according the present invention may support both a still image shooting mode and a moving image shooting mode. Here, a different e-mail address may be designated for each mode as a destination address of the image data.

Figure 9:
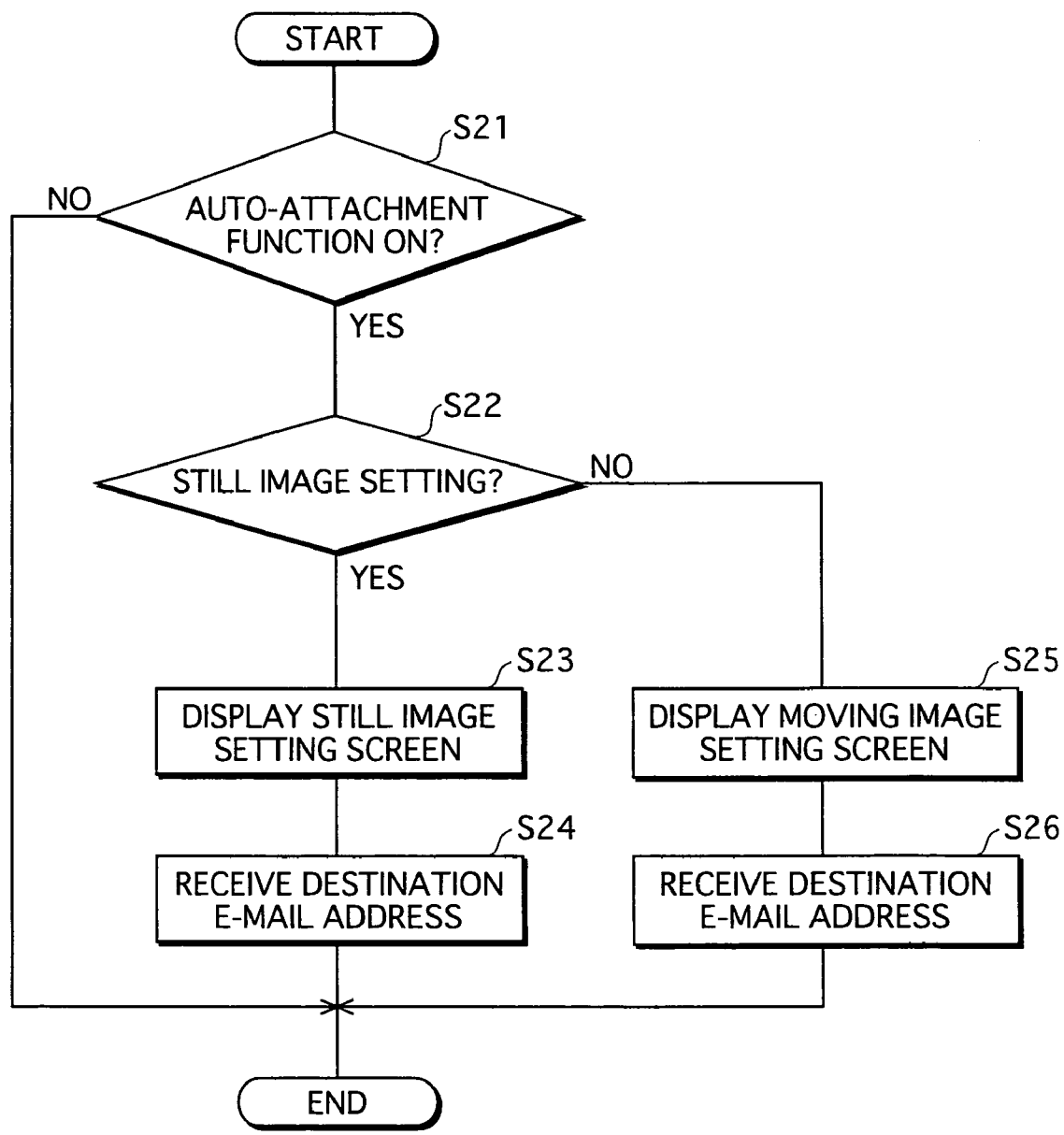
FIG. 9 is a flowchart of procedural steps performed by the communications terminal according to the modification to receive a user input of a destination e-mail address.

FIG. 9 is a flowchart of procedural steps performed by the communications terminal according to the modification to receive a user input of a destination e-mail address.

In response to a user instruction, the communications terminal first displays a screen for auto-attachment setting on the display unit. When receiving a user operation for setting the auto-attachment function to ON (step S21: YES), the communications terminal displays a screen for a user selection of either a still image destination address setting or a moving image destination address setting.

When the user selects the still image destination address setting (step S22: YES), the processing moves onto a step S23. On the other hand, when the user selects the moving image destination address setting (step S22: NO), the processing moves onto a step S25.

In accordance with the selection made in the step S22 (step S22: YES), the communications terminal displays a menu screen for still image setting (step S23), and receives a user input of a destination e-mail address (step S24). The processing is then terminated.

In accordance with the selection made in the step S22 (step S22: NO), the communications terminal displays a screen for moving image setting (step S25), and receives a user input of a destination e-mail address (step S26). The processing is then terminated.

(3) Furthermore, in the case of shooting a moving image to generate image data to be transmitted as an e-mail attachment, there may be a case where a moving image is shot for a predetermined time period of five seconds, for example. In another case, the moving image is shot for a duration staring upon a start instruction and ends upon an end instruction. Here, the latter case is described with reference to a flowchart shown in FIG. 10.

Figure 10:
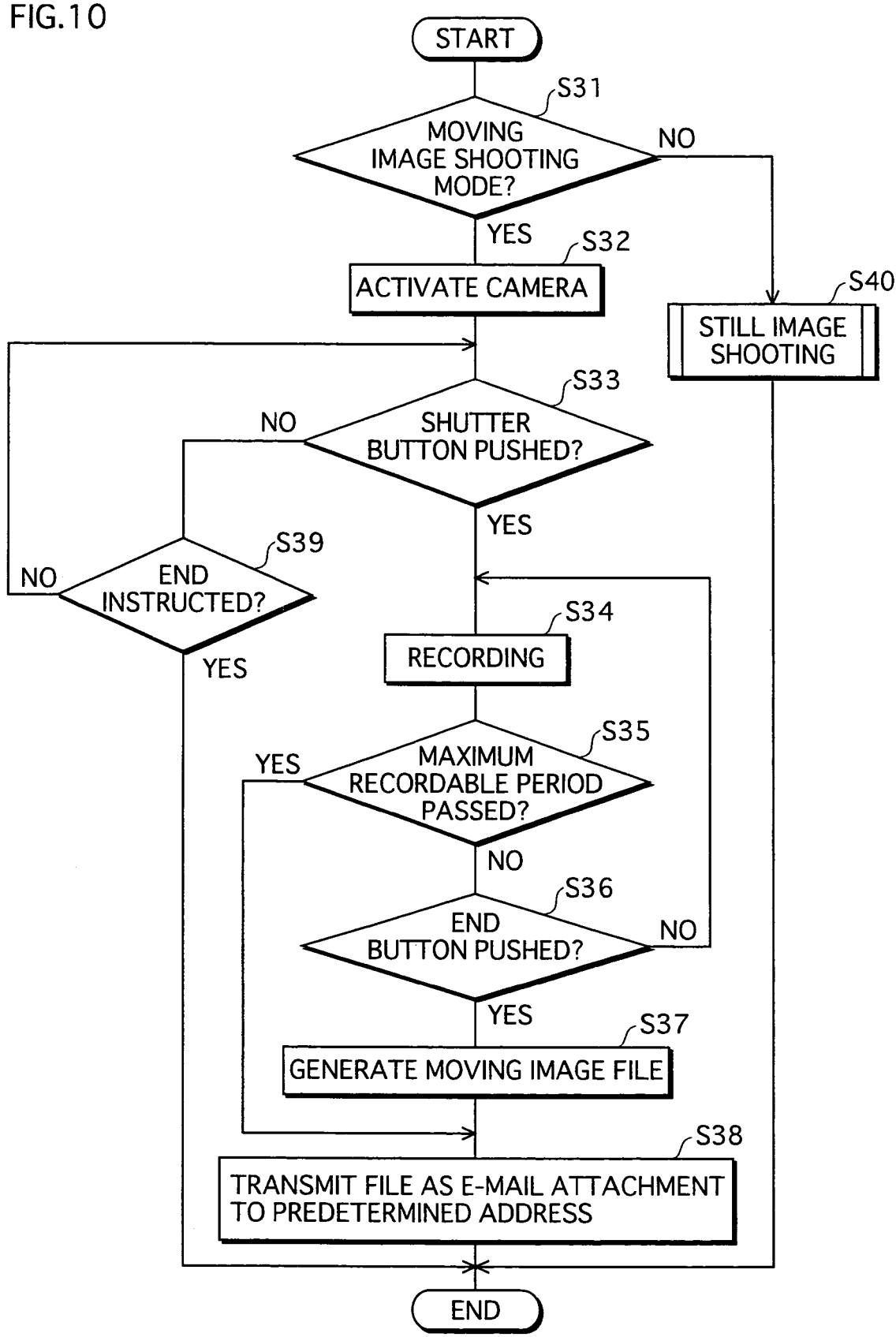
FIG. 10 is a flowchart of procedural steps performed by the communications terminal for shooting an image.

FIG. 10 is a flowchart of procedural steps performed for shooting a moving image and for automatically sending the shot moving image as an e-mail attachment.

First, the communications terminal having an image shooting function receives a user instruction specifying either of the two image shooting modes. On receiving the instruction requesting the communications terminal to go into the moving image shooting mode (step S31: YES), the processing goes onto a step S32. On the other hand, on receiving the instruction requesting the communications terminal to go into the still image shooting mode (step S31: NO), the processing goes onto a step S40. The processing performed in the step S40 in the still image shooting mode is identical to the still image shooting described in the embodiment 1. Thus, no description thereof is given here.

In the step S32, the communications terminal activates the camera unit, and assigns the shutter button function to one of a plurality of operating buttons. During the time the image shooting is not performed, the shutter button functions as a start button instructing to start the image shooting. During the image shooting, the shutter button functions as an end button instructing to end the image shooting.

At a push of the shutter button by the user (step S33: YES), the recording of a moving image is started (step S34).

If the maximum recordable period has passed (step S35: YES), the processing moves onto a step S37, skipping a step S36. Otherwise (step S35: NO), the processing moves onto the step S36.

In the step S36, a judgment is made as to whether the shutter button now functioning as an end button is pushed. At a push of the end button (step S36: YES), the recording is terminated and a file of the shot moving image is generated (step S37). Until the end button is pushed, i.e. while the end button is not pushed (step S36: NO), the processing goes back to the step S34.

When the moving image file is generated in the step S37, the thus generated moving image file is automatically transmitted as an e-mail attachment to the already designated e-mail address (step S38).

In the case of receiving an end instruction from the user (step S39: YES) before the shutter button is pushed (step S33: NO), the processing is terminated.

(4) In each embodiment, the communications terminal having an image shooting function shoots an image to generate image data at a push of the shutter button by a user, and transmits the image data as an e-mail attachment. In one alternative, the communications terminal may be configured to perform the same operations in response to user's voice. In another alternative, the communications terminal may be configured to perform the same operations when triggered by a self-timer.

(5) As described above, the communications terminal having an image shooting function according to the present invention may support, in addition to a conventional image shooting mode, the above-described image shooting mode (referred to as a one-touch transmission mode, for example). Furthermore, the communications terminal may be provided with a shutter button for the one-touch transmission mode, in addition to a shutter button for the conventional image shooting mode. Alternatively, a shutter button for the conventional image shooting mode may be commonly used for the one-touch transmission mode. In this case, when the shutter button is pushed longer than a predetermined period, the series of operation is performed as described in each embodiment, so that the image shooting is performed to generate image data and the image data is automatically attached to an e-mail message.

(6) In each embodiment, when the communications terminal having an image shooting function according to the present invention is in the image shooting mode, a push of the shutter button by a user will cause the communications terminal to automatically perform a series of operations including shooting an image to generate image data, attaching the image data to an e-mail message, and transmitting the e-mail message to a destination e-mail address designated in advance. In one alternative, however, the communications terminal may be constituted to shoot an image to generate image data and display the image data on the display unit in response to a push of the shutter button by a user. Subsequently, the communications terminal may allow the user to select whether to save the image data.

When the user instructs the communications terminal to save the image data displayed on the display unit after visually confirming the displayed image data, the communications terminal saves the image data in its internal memory, for example. In addition, the communications terminal attaches the image data to an e-mail message and transmits the e-mail message to the designated destination e-mail address.

(7) In another alternative, after shooting an image to generate image data at a push of the shutter button by a user, the communications terminal may display the image data on the display unit, along with a destination e-mail address. Subsequently, the communications terminal may allow the user to select whether to transmit the displayed image data do the displayed e-mail address.

When the user instructs the communications terminal to save the image data displayed on the display unit after visually confirming the displayed image data and destination e-mail address, the communications terminal performs the transmission of the image data as an e-mail attachment to the destination e-mail address.

(8) The communications terminal having an image shooting function according to the present invention may be provided with a function of acquiring a current date and time. With this function, the step S3 shown in FIG. 5 and the step S12 shown in FIG. 8 may be modified to insert the current date and time acquired at the time of the image shooting in the subject or in the text-based message body of the e-mail message.

(9) Further, the communications terminal having an image shooting function according to the present invention may be provided with a function of acquiring a current location of the communications terminal, such as a GPS (Global Positioning System). With this function, the step S3 shown in FIG. 5 and the step S12 shown in FIG. 8 may be modified to insert the location of the image shooting in the subject or in the text-based message of the e-mail message.

(10) The procedural steps described in each embodiment (shown in FIGS. 5, 8, 9, and 10) performed by the communications terminal may be embodied as a program that is executable by a communications terminal having a program execution function and an image shooing function. Such a program may be distributed in form of recording medium storing the program or via various communications channels.

Examples of such a recording medium include an IC card, optical disc, flexible disk, and ROM. The distributed program may be put to use by being installed to a communications terminal having a program executive function and an image shooting function. The communications terminal performs operations described in the above embodiments by executing the program installed.

INDUSTRIAL APPLICABILITY

A communications terminal having an image shooting function according to the present invention allows users to shoot an image and transmit the shot image as an e-mail attachment to a predetermined e-mail address, simply by giving an image shooting instruction. That is to say, image data is transmitted to another communications terminal owned by another user more easily and more conveniently than in a conventional manner. With this effect, the present invention is significantly useful in the field of communications terminals having an image shooting function.

The invention claimed is:

1. A communications terminal having an image shooting function, comprising:
   a shooting-mode instruction receiving unit operable to receive, from a user, an instruction to switch the communications terminal into an image shooting mode;
   a mail composition unit operable, when the communications terminal is switched into the image shooting mode, to extract from a recording medium, storing one or more mail addresses, an e-mail address that is associated with information indicating image data transmission and to generate an e-mail message directed to the e-mail address;
   a shooting instruction receiving unit operable to receive the image shooting instruction from the user;
   a generating unit operable to generate the image data by shooting the image based on the received image shooting instruction; and
   an attaching unit operable to, on generation of the image data by the generating unit, automatically attach the image data to the e-mail message generated by the mail composition unit.

2. The communications terminal according to claim 1, wherein
   the image data is moving image data,
   the generating unit generates the moving image data by shooting a moving image for a predetermined duration based on the image shooting instruction received by the shooting instruction receiving unit, and
   on generation of the moving image data, the attaching unit automatically attaches the moving image data to the e-mail message generated by the mail composition unit.

3. The communications terminal according to claim 1 wherein the image data is moving image data, the communications terminal further comprises:
   a start instruction receiving unit operable to receive from the user a start instruction requesting to start the image shooting; and
   an end instruction receiving unit operable to receive from the user an end instruction requesting to end the image shooting,
   the generating unit operable to generate the moving image data by shooting a moving image for a duration starting upon receipt of the start instruction and ending upon receipt of the end instruction, and
   on generation of the moving image data by the generating unit, the attaching unit automatically attach the moving image data to the e-mail message generated by the mail composition unit.

4. The communications terminal according to claim 1, further comprising:
   a display unit operable to visually present the image data on generation of the image data by the generating unit; and
   a save instruction receiving unit operable to receive from the user an instruction as to whether to save the presented image data, wherein
   only when the save instruction receiving unit receives an affirmative instruction, the image data is saved and the attaching unit automatically attaches the image data to the e-mail message generated by the mail composition unit.

5. The communications terminal according to claim 1, further comprising:
   a display unit operable to, on generation of the image data by the generating unit, visually present the image data along with the e-mail address extracted by the mail composition unit; and
   a transmission instruction receiving unit operable to receive from the user an instruction as to whether to transmit the presented image data as an attachment to the e-mail message directed to the presented e-mail address, wherein
   only when the transmission instruction receiving unit receives an affirmative instruction, the attaching unit automatically attaches the presented image data to the e-mail message generated by the mail composition unit.

6. The communications terminal according to claim 1, comprising:
   first and second operating buttons each for receiving the image shooting instruction from the user, wherein
   at a push of the first operating button, the image shooting is performed to generate the image data, and
   at a push of the second operating button, the image data is automatically attached to the e-mail message having been generated by the mail composition unit prior to the image shooting.

7. The communications terminal according to claim 1, comprising:
   an operating button for receiving the image shooting instruction from the user, wherein
   at a push of the operating button for less than a predetermined time period, the image shooting is performed to generate the image data, and
   at a push of the operating button for the predetermined time period or longer, the image shooting is performed to generate the image data, and the image data is automatically attached to the e-mail message generated by the mail composition unit.

8. The communications terminal according to claim 1, comprising:
   a plurality of operating buttons each for receiving the image shooting instruction from the user; and
   a storing unit operable to store e-mail addresses each in association with one of the operating buttons, wherein at a push of one of the operating buttons, the image shooting is performed to generate the image data, and the image data is automatically attached to an e-mail message directed to an e-mail address associated with the pushed operating button.

9. The communications terminal according to claim 1, comprising:

a clock unit operable to acquire a current date and time; and a date and time inserting unit operable to insert the date and time acquired at a time of the image shooting into text of the e-mail message to which the image data is automatically attached.

10. The communications terminal according to claim 1, comprising:

a current location acquiring unit operable to acquire a current location of the communications terminal; and a location inserting unit operable to insert the location of the communications terminal acquired at a time of the image shooting into text of the e-mail message to which the image data is automatically attached.

11. A computer-readable recording medium encoded with a computer program executable by a communications terminal having an image shooting function, the program comprising code operable to cause the communications terminal to perform:

a shooting-mode instruction receiving step of receiving, from a user, an instruction to switch the communications terminal into an image shooting mode;

a mail composition step of, when the communications terminal is switched into an image shooting mode, extracting from a recording medium storing one or more mail addresses an e-mail address that is associated with information indicating image data transmission and generating an e-mail message directed to the e-mail address;

a shooting instruction receiving step of receiving an image shooting instruction from the user;

a generating step of generating image data by shooting an image based on the received image shooting instruction; and an attaching step of, on generation of the image data in the generating step, automatically attaching the image data to an e-mail message directed to the e-mail address designated according to the address generated in the mail composition step.

12. The communications terminal according to claim 1, further comprising a transmitting unit operable to transmit the e-mail message on automatic attachment of the image data to the e-mail message by the attaching unit.

13. The communications terminal according to claim 2, further comprising a transmitting unit operable to transmit the e-mail message on automatic attachment of the image data to the e-mail message by the attaching unit.

14. The communications terminal according to claim 3, further comprising a transmitting unit operable to transmit the e-mail message on automatic attachment of the image data to the e-mail message by the attaching unit.

15. The communications terminal according to claim 4, further comprising a transmitting unit operable to transmit the e-mail message on automatic attachment of the image data to the e-mail message by the attaching unit.

16. A handheld communication terminal having an image shooting function and a telephone function with a telephone keyboard with an array of keys having different modes of operation in addition to entering a phone number, comprising:

a transmission/reception unit for sending and receiving wireless communications;

a camera unit for performing image shooting;

a display unit;

an operation control unit connected to the telephone keyboard, transmission/reception unit, camera unit and display unit and having a memory unit to receive and store in a related manner e-mail addresses, names and telephone numbers;

wherein the operation control unit assigns a plurality of keys in the array of keys to each perform as a shutter button to start an image shooting by the camera unit, each assigned key in the plurality of keys corresponding to a specific name in the memory unit, and the operation control unit enables the transmission/reception unit to attach the shot image as an e-mail attachment to the e-mail address associated with the pushed shutter button and transmit the e-mail attachment.

17. The handheld communication terminal of claim 16 wherein the display unit can display the names associated with each of the plurality of keys set for an image shooting function as a shutter button for the camera unit.

* * * * *